United States Patent
Miao et al.

(10) Patent No.: US 11,190,960 B2
(45) Date of Patent: *Nov. 30, 2021

(54) METHODS AND APPARATUSES FOR CONTROL RESOURCE MAPPING

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/783,558

(22) Filed: Feb. 6, 2020

(65) Prior Publication Data
US 2020/0178099 A1 Jun. 4, 2020

Related U.S. Application Data

(63) Continuation of application No. 16/636,146, filed as application No. PCT/CN2017/095853 on Aug. 3, 2017.

(51) Int. Cl.
*H04L 12/28* (2006.01)
*H04W 24/08* (2009.01)
(Continued)

(52) U.S. Cl.
CPC ........... *H04W 24/08* (2013.01); *H04L 5/0007* (2013.01); *H04L 27/2605* (2013.01);
(Continued)

(58) Field of Classification Search
CPC . H04W 48/12; H04W 72/04; H04W 72/0406; H04W 72/0453; H04L 5/0023;
(Continued)

(56) References Cited

U.S. PATENT DOCUMENTS

2014/0024052 A1 1/2014 Dapprich et al.
2016/0316456 A1 10/2016 Blankenship et al.
(Continued)

FOREIGN PATENT DOCUMENTS

CN 104718715 A 6/2015
CN 104769871 A 7/2015

OTHER PUBLICATIONS

International Search Report for PCT/CN2017/095853 dated May 4, 2018 [PCT/ISA/210].
(Continued)

*Primary Examiner* — John Pezzlo
(74) *Attorney, Agent, or Firm* — Sughrue Mion, PLLC

(57) ABSTRACT

Embodiments of the present disclosure relate to methods and apparatuses for control resource mapping. In example embodiments, a method implemented in a communication device is provided. According to the method, REG indices for a plurality of REGs are obtained in a control channel region. The REG bundle indices are determined based on the REG indices and a pattern of REG bundle. The pattern of REG bundle indicates the number of REGs in the frequency domain and the number of OFDM symbols in the time domain. CCE indices are determined based on the determined REG bundle indices and the number of CCEs in the control channel region. The CCE indices are continuous with respect to the REG bundle in the frequency domain.

15 Claims, 7 Drawing Sheets

(51) Int. Cl.
   *H04L 5/00*    (2006.01)
   *H04W 72/12*   (2009.01)
   *H04W 72/04*   (2009.01)
   *H04L 27/26*   (2006.01)
   *H04J 1/16*    (2006.01)

(52) U.S. Cl.
   CPC ..... *H04W 72/042* (2013.01); *H04W 72/0453* (2013.01); *H04W 72/1289* (2013.01)

(58) Field of Classification Search
   CPC .. H04L 27/2602; H04L 5/0053; H04L 5/0007
   USPC .................................. 370/252, 329, 442, 430
   See application file for complete search history.

(56) References Cited

U.S. PATENT DOCUMENTS

| | | | |
|---|---|---|---|
| 2018/0227156 A1* | 8/2018 | Papasakellariou .. | H04W 74/006 |
| 2018/0324770 A1* | 11/2018 | Noganni ................. | H04L 5/005 |
| 2018/0359755 A1* | 12/2018 | Sun ........................ | H04L 5/0053 |
| 2019/0069276 A1* | 2/2019 | Kwak ................... | H04L 5/0053 |
| 2019/0103941 A1* | 4/2019 | Seo .......................... | H04L 5/00 |
| 2020/0021419 A1* | 1/2020 | Taherzadeh Boroujeni ................ | H04L 5/0091 |
| 2020/0068540 A1* | 2/2020 | Wang .................... | H04L 5/0091 |
| 2020/0119865 A1* | 4/2020 | Jiao ....................... | H04L 5/005 |
| 2020/0119869 A1* | 4/2020 | Taherzadeh Boroujeni ................ | H04L 5/0094 |

OTHER PUBLICATIONS

Written Opinion for PCT/CN2017/095853 dated May 4, 2018 [PCT/ISA/237].
NEC, "PDCCH structure for NR", 3GPP TSG-RAN WG1 Meeting #89, R1-1707199, May 15-19, 2017, 4 pages.
Sharp, "REG bundling per CCE for NR PDCCH", R1-1708370, 3GPP TSG RAN WG1 Meeting #89, May 15-19, 2017, 5 pages.
Ericsson, "Overview of DL Control Channel Design", R1-1709062, 3GPP TSG-RAN WG1 Meeting#89, May 15-19, 2017, 10 pages.
ZTE, "CCE mapping with REG bundling", R1-1710104, 3GPP TSG RAN WG1 NR Ad-Hoc#2, Jun. 27-30, 2017, 16 pages.
European Communication dated Jul. 1, 2020 by the European Patent Office in application No. 17919833.8.
Panasonic, "Configuration of Coreset", 3GPP TSG RAN WG1 NR Ad-Hoc#2, R1-1711329, Qingdao, P.R. China, Jun. 27-30, 2017 (3 pages total).
Non-Final Office Action dated Sep. 10, 2020 in U.S. Appl. No. 16/636,146.
Office Action dated Dec. 22, 2020 in Australian Application No. 2017426186.
Japanese Office Action for JP Application No. 2020-505463 dated Sep. 28, 2021 with English Translation.
Huawei et al., "CCE-to-REG Mapping", 3GPP TSG RAN WG1 Meeting #89, R1-1706946, Hangzhou, China, May 15-19, 2017, pp. 1-9.

* cited by examiner

METHODS AND APPARATUSES FOR CONTROL RESOURCE MAPPING

CROSS REFERENCE TO RELATED APPLICATIONS

This application is a Continuation Application of U.S. application Ser. No. 16/636,146, filed Feb. 3, 2020, which is a National Stage of International Application No. PCT/CN2017/095853 filed Aug. 3, 2017.

TECHNICAL FIELD

Embodiments of the present disclosure generally relate to the field of communications, and in particular, to methods and apparatuses for control resource mapping.

BACKGROUND

In the Third Generation Partnership Project (3GPP) Long Term Evolution (LTE) communication systems, a Physical Downlink Control Channel (PDCCH) is employed to carry the downlink control information (DCI) for a mobile user, such as User Equipment (UE) specific scheduling information for downlink resource allocation for the mobile users, uplink grants, Physical Random Access Channel (PRACH) responses, uplink power control commands, and common scheduling assignments for signaling messages, such as the system information, paging information and the like.

At the beginning of each subframe in the LTE communication system, a PDCCH for a mobile user occupies the first 1 or 2 or 3 Orthogonal Frequency Division Multiplexing (OFDM) symbols (except in the case of a 1.4 MHz channel, where it's the first 2 or 3 or 4 OFDM symbols) in the time domain. The number of OFDM symbols in any given subframe is indicated in the Physical Control Format Indicator Channel (PCFICH), which is located in the first OFDM symbol of each subframe.

The minimum resource unit in the LTE communication system is referred to as a Resource Element (RE), which is indicated by one OFDM symbol in the time domain and one subcarrier in the frequency domain. A Resource Element Group (REG) is constructed from the REs. Each REG contains 4 consecutive REs (or 4 REs separated by a cell-specific Reference Signal (RS)) within the same OFDM symbol and the same resource block.

A Control Channel Element (CCE) is the basic resource allocation unit for the PDCCH in LTE communication system. It is agreed in the LTE communication system that each CCE is mapped to 9 REGs, which are distributed across the first 1 or 2 or 3 OFDM symbols and the system bandwidth through interleaving to enable diversity and to mitigate interference. The number of CCEs in a PDCCH is referred to as CCE aggregation level, which may be 1, 2, 4, or 8 consecutive CCEs for example, in the LTE communication system. The total number of available CCEs is determined by the PCFICH configuration and the system bandwidth. It is desirable that in the LTE communication system the PDCCHs for a plurality of UEs in a subframe may use different aggregation levels, depending on the respective DCI formats for the plurality of UEs.

SUMMARY

In general, example embodiments of the present disclosure provide methods and devices for control resource mapping.

In a first aspect, there is provided a method implemented in a communication device. According to the method, REG indices are obtained for a plurality of REGs in a control channel region. The REG bundle indices are determined based on the REG indices and a pattern of REG bundle. The pattern of REG bundle indicates the number of REGs in frequency domain and the number of OFDM symbols in time domain. The CCE indices are determined based on the determined REG bundle indices and the number of CCEs in the control channel region, the CCE indices being continuous with respect to the REG bundle in frequency domain.

In a second aspect, there is provided a communication device. The communication device comprises a processor and a memory coupled to the processor. The memory stores instructions that when executed by the processor, cause the communication device to performs actions. The actions comprise: obtaining REG indices for a plurality of REGs in a control channel region; determining REG bundle indices based on the REG indices and a pattern of REG bundle, the pattern of REG bundle indicating the number of REGs in frequency domain and the number of OFDM symbols in time domain; and determining CCE indices based on the determined REG bundle indices and the number of CCEs in the control channel region, the CCE indices being continuous with respect to the REG bundle in frequency domain.

In a third aspect, there is provided a computer readable medium having instructions stored thereon. The instructions, when executed on at least one processor, cause the at least one processor to carry out the method according to the first aspect.

In a fourth aspect, there is provided a computer program product that is tangibly stored on a computer readable storage medium. The computer program product includes instructions which, when executed on at least one processor, cause the at least one processor to carry out the method according to the first aspect.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
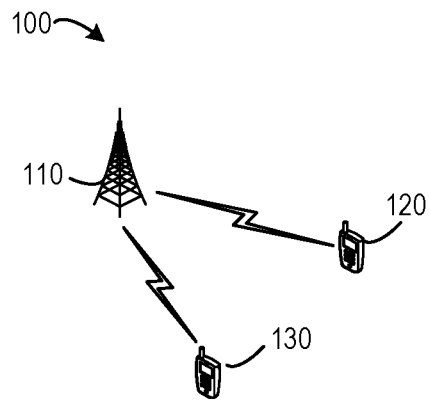
FIG. 1 is a schematic diagram 100 of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB), a Transmission Reception Point (TRP), a Remote Radio Unit (RRU), a radio head (RH), a remote radio head (RRH), a low power node such as a femto node, a pico node, and the like. For the purpose of discussion, in the following, some embodiments will be described with reference to TRP as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 is a schematic diagram 100 of a communication environment in which embodiments of the present disclosure can be implemented. The network 100 includes a network device 110 and a plurality of terminal devices 120 and 130 served by the network device 110. The serving area of the network device 110 is referred to as a cell. It is to be understood that the number of network devices and terminal devices is only for the purpose of illustration without introducing any limitations. The network 100 may include any suitable number of network devices and terminal devices adapted for implementing implementations of the present disclosure. Although not shown, it would be appreciated that more terminal devices may be located in the cell and served by the network device 110.

The network device 110 may transmit the DCI for the two terminal devices 120 and 130. The network device 110 may map physical REG resources in the control channel region into the CCE resources. For a specific control channel region, the control resource may be organized into a plurality of REGs, which may be further indexed by a plurality of REG indices. The mapping between the REGs to CCEs may be implemented, for example, by mapping the plurality of REG indices to a plurality of CCE indices. Based on the CCE resources and the CCE aggregation levels, the network device 110 determines the specific CCE resources for the two DCI transmissions for terminal devices 120 and 130, respectively.

In conventional LTE communication systems, 9 REGs are mapped to a CCE in a control channel region. It is desirable that the 9 REG may be interleaved first in order to obtain diversity gain and mitigate the interference. In the New Radio Access (NR) communication system, REG bundle is introduced and the REGs in one REG bundle are contiguous in the frequency and/or time domain. It is agreed that the REG bundling in a CCE is supported for NR-PDCCH. It is also agreed in RAN1#87 that NR should support dynamic reuse of at least part of resources in the control channel region for data transmission for the same or a different UE, at least in the frequency domain. In the LTE communication system, the REG resource is directly mapped to CCE, i.e., the REGs are not mapped to the REG bundle. As the REG indices are totally interleaved in the LTE system, REG bundle structure cannot be formed. That is, it is impossible for the conventional REG to CCE mapping solutions in the LTE system to support the REG bundling requirements in the NR system.

In order to solve the problems above and one or more of other potential problems, a solution for control resource mapping is provided in accordance with example embodiments of the present disclosure. In a given control channel region, it is assumed that there are a plurality of REGs, which are indexed by a plurality of REG indices. In some embodiments, the plurality of REG indices may be continuous in each of the OFDM symbols, which means that the REGs in each OFDM symbol of the control channel region are indexed separately, starting from an index of '0' in each OFDM symbol. Therefore, the REGs may be indexed per OFDM symbol in the control region. In one embodiment, the REGs may be indexed by the REG initial indices.

Additionally, the REG initial indices may be continuous in different OFDM symbols in the control channel region. In another embodiment, the REG indices may be derived from the REG initial indices. To support the REG bundle, the REG indices for a plurality of REGs in the control channel region are mapped to the REG bundle indices based on the REG indices and a pattern of REG bundle. The REG bundle is a control channel resource unit, which includes a plurality of REGs in the time and/or frequency domain. Specifically, the pattern of REG bundle may indicate the number of REGs in the frequency domain and the number of OFDM symbols in the time domain. As the bandwidth of NR communication system may be very large, it may be advantageous to support the REG bundle when performing the REG to CCE mapping, which may facilitate the simplicity of decoding and simplify the REG to CCE mapping complexity.

In another embodiment, the CCE indices may be determined based on the REG bundle indices and the total number of CCEs in the control channel region so that the determined CCE indices are continuous with respect to the REG bundle in the frequency domain. Based on the CCE indices and the CCE aggregation level, the CCEs are determined for the DCI of the two terminal devices 120 and 130, and then the DCI of the terminal devices 120 and 130 are transmitted in the determined CCE resources in PDCCHs or NR-PDCCHs.

Figure 2:
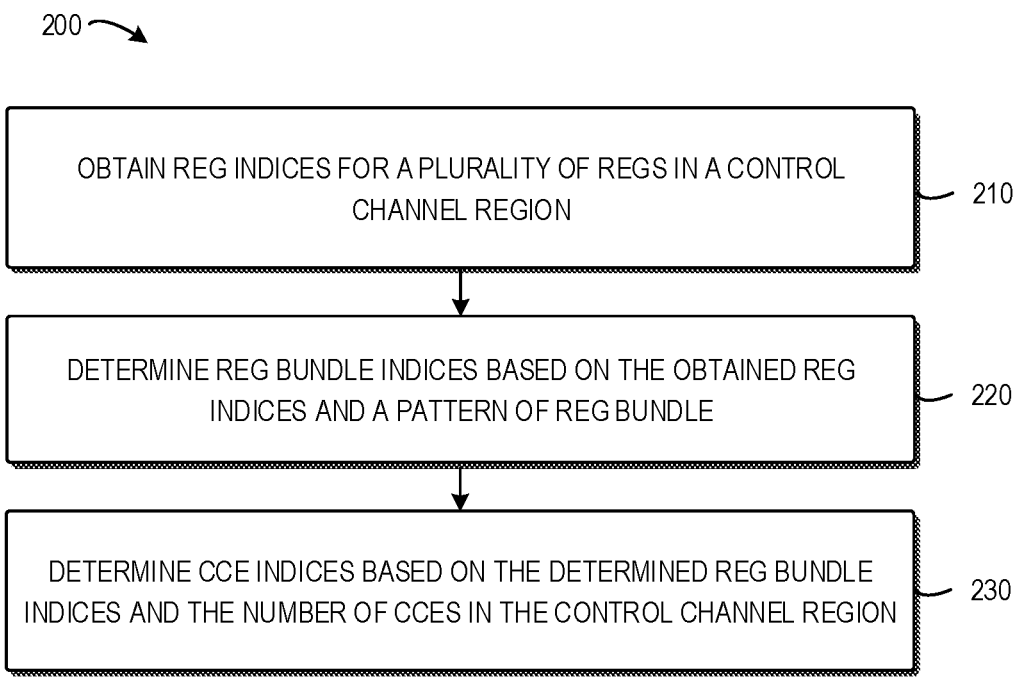
FIG. 2 shows a flowchart of a method 200 for control resource mapping in accordance with some embodiments of the present disclosure.

Principle and implementations of the present disclosure will be described in detail below with reference to FIGS. 2-6. FIG. 2 shows a flowchart of a method 200 for control resource mapping in accordance with some embodiments of the present disclosure. The method 200 may be implemented by the network device 110 or the terminal devices 120 and/or 130.

In block 210, the REG indices are obtained for a plurality of REG in a control channel region. For example, in the NR communication system, the control channel region is control resource set (CORESET). The time and frequency configuration of the CORESET, such as the time duration, frequency domain resource and/or the stating OFDM symbol of the CORESET, may be indicated by the higher signaling, for example the Radio Resource Control (RRC) signaling, Media Access Control (MAC) Control Elements (CE) and/or system broadcasting information. Unlike the PDCCH configuration of the LTE system, in the CORESET of NR communication system, it is agreed that a REG includes 12 successive REs in an OFDM symbol, which is equal to the frequency duration of a Physical Resource Block (PRB). The time and frequency source of the control channel region may be determined from the higher layer signaling, which means that the REG configuration of the control channel region may be obtained.

Figure 3A:
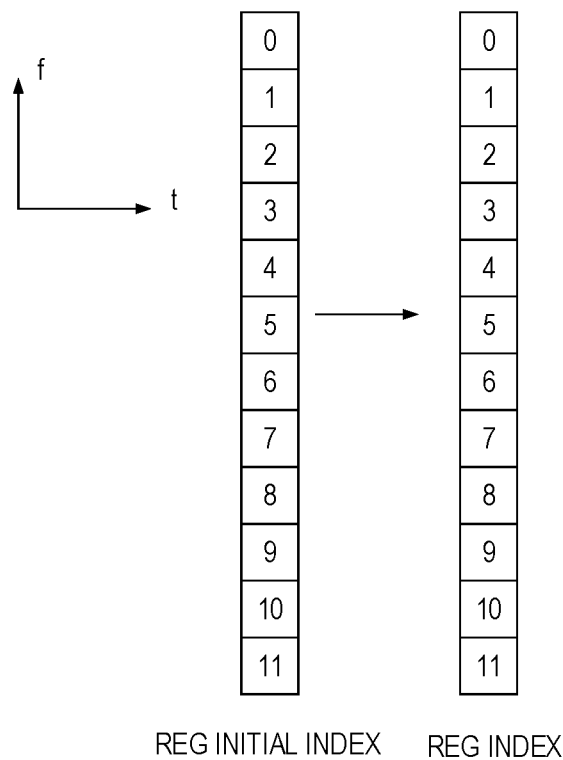
FIGS. 3A-3C show schematic diagrams of control resource mapping from REG initial index to REG index according to embodiments of the present disclosure, respectively.
Figure 3B:
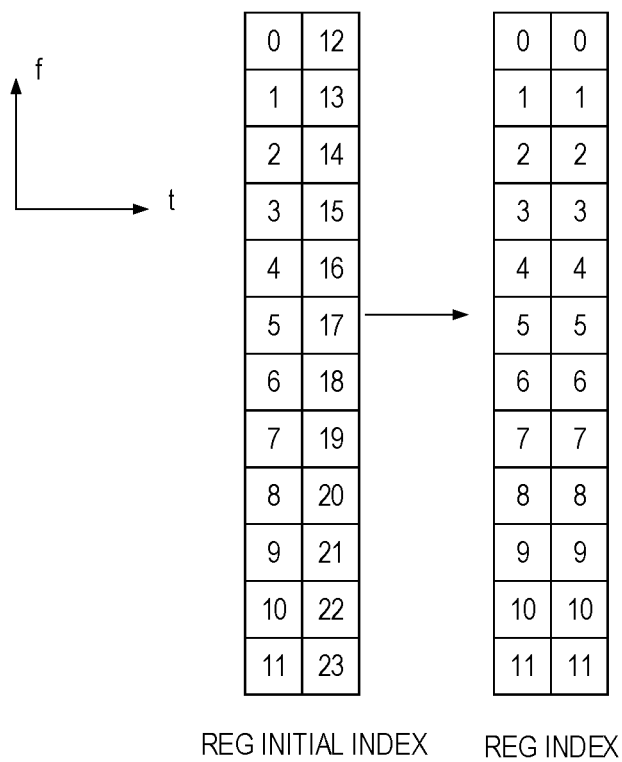
Figure 3C:
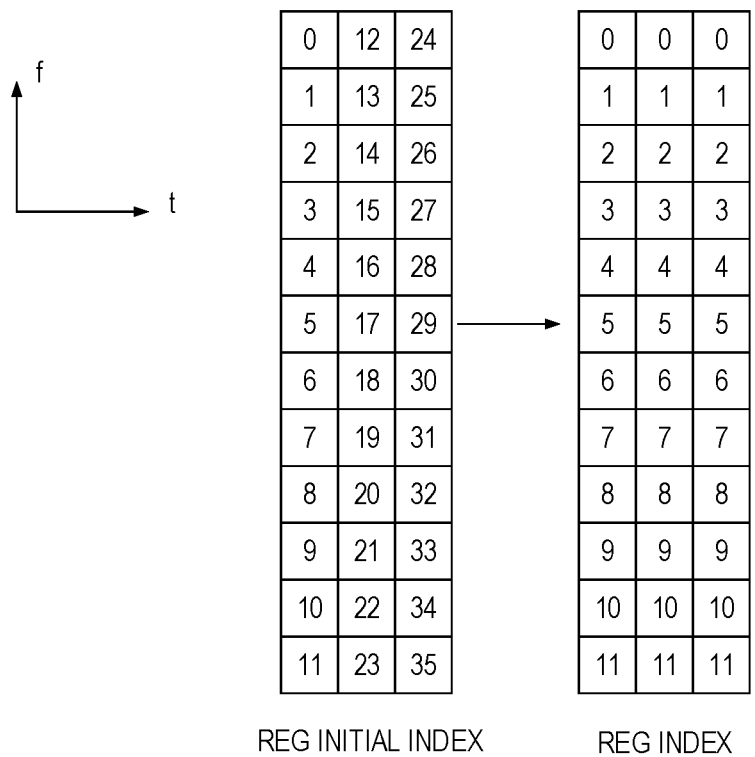

In another embodiment, the REG initial indices for a plurality of REGs in the control channel region are obtained. The REG initial indices are continuous in different OFDM symbols in the control channel region. The REG indices may be determined from the REG initial indices. As aforementioned, the REG indices are continuous in each OFDM symbol, starting from an index of '0' respectively for each OFDM symbols. The example illustration of the conversion from the REG initial indices to the REG indices can be found in FIGS. 3A-3C. In FIGS. 3A-3C, the numbers of OFDM symbols are 1, 2 and 3, respectively. In the frequency domain, there are 12 REGs in each OFDM symbol of the control channel region, which is only for illustration purpose, without suggesting any limitations as to the scope of the present disclosure. For example, the conversion from the REG initial indices to the REG indices may be realized by performing a modulo operation on the REG initial indices with respect to a width of the control channel region in order to obtain the REG indices as discussed above. It should be noted that the width of the control channel region is represented by the number of REGs in the control channel region in the frequency domain. In FIGS. 3A-3C, the width of the control channel region is 12, which is described only for illustration purpose, without suggesting any limitations to the present disclosure.

It should be mentioned that in FIGS. 3A-3C, the conservation from REG initial indices to the REG indices and all the specific numeral values are described only for illustration purpose, without suggesting any limitations as to the scope of the present disclosure. With the teaching and suggestions in the present disclosure, the skilled in the art may conceive the modification, change and/or variant of the example implementations, which may fall within the scope of the disclosure.

In one embodiment, the REG indices for the plurality of REGs are indexed in an order of frequency of REGs for each of the OFDM symbols in the control channel region. More specifically, for each of the OFDM symbols of the control channel region, the plurality of REGs are indexed respectively, starting from an index of '0' for example. Example illustration can be found in FIGS. 4A-4G, in which there are one, two or three OFDM symbols in the control channel region. For each of the two OFDM symbols, there are 12 REGs in the frequency domain respectively. The basic unit of the blocks in FIGS. 4A-4G is illustrated as one REG in the control channel region. Each index from '0' to '11' for a REG is referred to as the REG index. It is appreciated that in each OFDM symbol, the 12 REGs are indexed from '0' to '11', respectively. In other words, the REG indices in each OFDM symbol are continuous starting from an index of '0'. More details will be discussed in FIGS. 4A-4G as below.

Referring back to FIG. 2, in block 220, the REG bundle indices are determined based on the REG indices and a pattern of REG bundle. The pattern of REG bundle, which is also known as the size of REG bundle, indicates the number of REGs in frequency domain and the number of OFDM symbols of the REG bundle in time domain. For example, in some embodiments, the time duration of the REG bundle is one OFDM symbol and the number of REGs in frequency domain is at least two for the one-symbol CORESET case, which can also be up to 6, for example. In another example embodiment, the time duration of the REG bundle is two or three OFDM symbols for the two or three-symbol CORESET cases. It should be mentioned that the pattern or the size of REG bundle may be indicated by the higher layer signaling for example.

In one embodiment, the determination of the REG bundle indices may be performed by employing the following steps. The REG indices may be divided by a width of the REG bundle, the width of the REG bundle indicating the number of REGs in a REG bundle in frequency domain. Then, the REG indices, which are divided by the width of the REG bundle, may be further rounded down as the REG bundle indices. Through these operations, the adjacent REGs in the frequency and/or time domain are grouped into one REG bundle so that the REGs in one REG bundle are contiguous in the frequency and/or time domain, which is agreed in NR communication systems. Example mapping from the REG indices to the REG bundle indices will be presented in the following description in FIGS. 4A-4G.

In block 230, the CCE indices are determined based on the determined REG bundle indices and the number of CCEs in the control channel region. The CCE indices are continuous with respect to the REG bundle in frequency domain. In this case, if one or more CCEs corresponding to one or more continuous CCE indices are allocated for the DCI transmission for a terminal device 120 or 130, the remaining CCE indices may be also continuous in the frequency domain, which means that the remaining physical CCE resources corresponding to the CCE indices in the control channel region are continuous in the frequency domain. As the resource allocation for the data transmission in Physical Downlink Shared Channel (PDSCH) may be based on a pair of PRBs for example, the remaining physical CCE resources in the control channel region can be reallocated to the PDSCH for the traffic data transmission. Therefore, as for the REG and CCE mapping methods in the present disclosure, it is advantageous for the skilled in the art to reuse at least part of the remaining unused CCE resources in the present disclosure for the traffic data transmission in PDSCH for example.

It is appreciated for the skilled in the art that the mapping from the REG bundle indices to the CCE indices may be also performed by an interleaver, such as the existing Tail-Biting Convolutional Coding (TBCC) interleaver in LTE systems. However, in the interleaver implementation for the REG bundle to CCE mapping, the CCE indices are not continuous in the frequency domain, which may prohibit the reuse of the control channel resource for the traffic data transmission. Moreover, the input and output mapping matrix for the existing interleavers in LTE systems are fixed, which is not flexible for different lengths of the REG bundle indices; and therefore there may be some cache waste in some implementation. It is desirable for the skilled in the art to implement different mapping method from REG bundle indices to the CCE indices to realize that the CCE indices are continuous with respect to the REG bundle in frequency domain. More illustrating examples will be presented in the following description.

In one embodiment, the determination of the CCE indices may be realized by performing modulo operation on the REG bundle indices with respect to the number of CCEs in the control channel region. The number of CCEs in the control channel region may be determined based on the number of the plurality of REGs in the control channel region and the number of REGs in a CCE. The CCE indices may be further obtained based on results of the above modulo operation. For example, the total number of REGs in the control channel region, such as the CORESET in NR systems may be determined according to the higher layer singling. For another example, the number of REGs in a CCE may be 6. Therefore, the number of CCEs in the control channel region may be $$\left\lfloor \frac{N}{6} \right\rfloor,$$

wherein N represents the total number of REGs in the control channel region, and $\lfloor \bullet \rfloor$ operator represents an operation of rounding down.

In another embodiment, the width of the REG bundle may be determined based on the number of REGs in a REG bundle and the number of OFDM symbols in the REG bundle in time domain. In other words, the width of the REG bundle may indicate the number of REGs in the frequency domain in a REG bundle.

In another embodiment, a plurality of parameters related to the REG bundle and control channel region may be determined from the higher layer signaling. Examples of such parameters includes, but are not limited to, the number of the plurality of REGs in the control channel region; the number of REGs in a REG bundle; the number of REGs in a REG bundle in frequency domain; the number of OFDM symbols in a REG bundle in time domain; and/or the number of REGs in a CCE, or the like.

At least part of the above plurality of parameters may be directly obtained from the higher layer signaling. Other parameters may be derived from the at least part of the parameters according to the relationship of the parameters. The skilled in the art may conceive the specific implementations with the teaching and suggestions in the present disclosure, which fall within the scope of the present disclosure.

In another embodiment, the communication device may be a network device 110. The above methods further comprise transmitting DCI of a plurality of terminal devices 120 and/or 130 in the control channel region based on the CCE indices and the CCE aggregation levels for the plurality of terminal devices 120 and 130. It should be mentioned that CCE aggregation level may be 1, 2, 4, 8, 16 or 32 in the NR communication system. More specifically, for a terminal device 120 or 130, the network device 110 may determine the CCE resource according to the CCE indices and the aggregation level of the terminal device. Then, the network device 110 may transmit the DCI for the terminal device on the determined CCE resource, which is referred to as PDCCH or NR-PDCCH.

In other embodiments where the method 200 is carried out by a terminal device 120 or 130, the method 200 may further comprise receiving DCI of the terminal device in the control channel region based on the CCE indices (not shown). The terminal device 120 or 130 may also perform mapping from the REG indices to REG bundle indices and the mapping from the REG bundle indices to the CCE indices, through which the terminal device 120 or 130 may learn the logical mapping relationship between the physical control channel resources, such as the REG, REG bundle and CCE and the logical indices, such as the REG initial indices, REG indices, REG bundle indices and CCE indices. According to the mapping relation between the physical control channel resource and the logical CCE indices, the terminal device 120 or 130 may search for its DCI in the control channel region by employing the potential CCE aggregation levels and Radio Network Temporary Identity (RNTI) of the terminal device 120 or 130. The searching process may be blind or semi-blind or non-blind, depending on the specific system implementations.

Now more examples of mapping from REG initial indices to the REG indices will be discussed with respect to FIGS. 3A-3C. FIGS. 3A-3C show schematic diagrams of control resource mapping from REG initial index to REG index according to embodiments of the present disclosure, respectively. As shown in FIG. 3A, it is assumed that in the control channel region, such as the CORESET in the NR system, there is one OFDM symbol in the time domain (represented by 't') and there are 12 REGs in the frequency domain (represented by 'f') in the control channel region. As the REG indices are required to be continuous for each OFDM symbol, the REG indices are the same to the REG initial indices for the REGs in this one-symbol control channel region.

As shown in FIG. 3B, it is assumed that in the control channel region, such as the CORESET in the NR system, there are two OFDM symbols in the time domain and there are 12 REGs in the frequency domain in each OFDM symbol in the control channel region. The total number of the REGs in the control channel region is 24. The REG initial indices are continuous in different OFDM symbols in the control channel region. As the REG indices are required to be continuous for each OFDM symbol, the mapping from the REG initial indices to the REG indices may be realized by employing a modulo operation. The modulo operation may be represented by ⌊n mod 12⌋, in which n represents the REG initial index, mod represents an modulo operation, and ⌊•⌋ operator represents an operation of rounding down.

As shown in FIG. 3C, it is assumed that in the control channel region, such as the CORESET in the NR system, there are three OFDM symbols in the time domain and there are 12 REGs in the frequency domain in each OFDM symbol in the control channel region. The total number of the REGs in the control channel region is 36. As discussed above, the REG initial indices are continuous in the three different OFDM symbols in the control channel region. The mapping from the REG initial indices to the REG indices may be also realized by employing the above modulo operation, so that the REG indices are be continuous for each OFDM symbol in the control channel region.

FIGS. 4A-4G show schematic diagrams of control resource mapping from REG index to CCE index according to embodiments of the present disclosure respectively. The skilled may appreciate that all the numeral values in the following description of FIGS. 4A-4G are only for illustrating purpose, without suggesting any limitations as to the scope of the present disclosure.

Figure 4A:
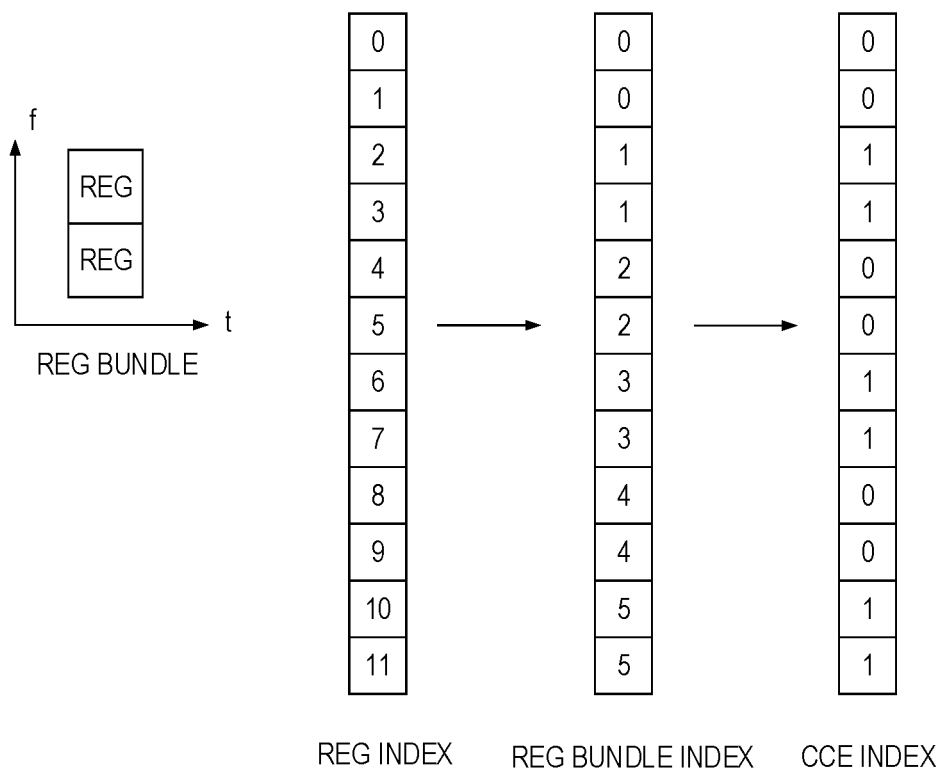
FIGS. 4A-4G show schematic diagrams of control resource mapping from REG index to CCE index according to embodiments of the present disclosure, respectively.

As shown in FIG. 4A, there is one OFDM symbol in the control channel region. The width of the control channel region, which may be represented by the number of REGs in the frequency domain of the control channel region, is 12 in this case. As for the pattern of the REG bundle, there is one OFDM symbol in time domain, which is equal to the number of OFDM symbols in the control channel region. The width of the REG bundle is two, which is represented by the number of REGs in the frequency domain in the REG bundle. As for the determination of the REG bundle indices, the REG indices may be first divided by the width of the REG bundle, and then the REG indices, which are divided by the width of the REG bundle, may be further rounded down in order to obtain integral REG indices. The details of these operations may be referred to the description illustrated according to FIG. 2. Accordingly, the determination of the REG bundle indices from the REG indices may be represented as $$\left\lfloor \frac{m}{s} \right\rfloor,$$

in which m represents the KEG index, s represents the width of the REG bundle, and ⌊•⌋ operator represents an operation of rounding down. In this case, s is equal to two. Through such operations, the every two REGs are grouped in one REG bundle; and therefore, the REGs in one REG bundle are contiguous in the frequency domain. As for the control channel region, it is assumed that there are 6 REGs in one CCE; and therefore there are two CCEs in the control channel region. As discussed above, the determination of the CCE indices from the REG bundle indices can be performed via modulo operation. The modulo operation can be represented as k mod 2, in which k represents the REG bundle index. By utilizing this modulo operation, the REG bundle indices are mapped to CCE indices, so that the CCE indices are continuous with respect to the REG bundle in frequency domain. Therefore, in the case of FIG. 4A, the CCE index may be indicated by $$\left\lfloor \frac{m}{2} \right\rfloor \mod 2,$$

in which m represents the REG index and ⌊•⌋ operator represents an operation of rounding down.

Figure 4B:
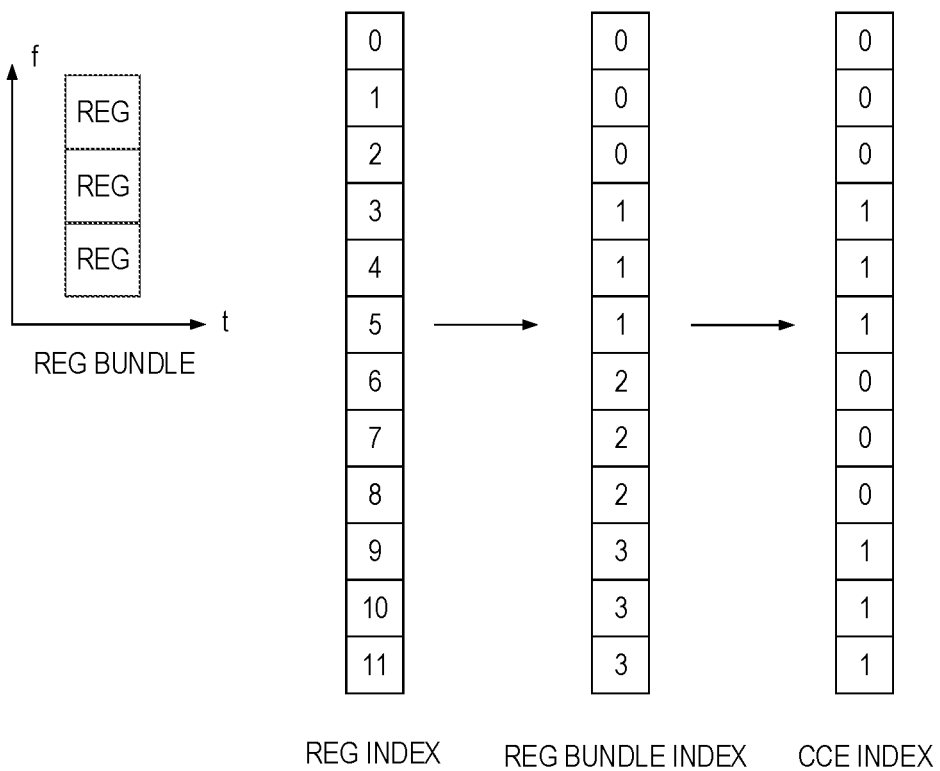

As shown in FIG. 4B, there is one OFDM symbol in the control channel region. The width of the control channel region, which may be represented by the number of REGs in the frequency domain of the control channel region, is 12 in this case. As for the pattern of the REG bundle, there is one OFDM symbol in time domain, which is equal to the number of OFDM symbols in the control channel region. The width of the REG bundle is three, which is represented by the number of REGs in the frequency domain in the REG bundle. Accordingly, the determination of the REG bundle indices from the REG indices may be represented as $$\left\lfloor \frac{m}{3} \right\rfloor,$$

in which m represents the KEG index and ⌊•⌋ operator represents an operation of rounding down. Through these operations, the every three consecutive REGs are grouped in one REG bundle; and therefore, the REGs in one REG bundle are contiguous in the frequency domain. As for the control channel region, it is assumed that there are 6 REGs in one CCE; and therefore there are two CCEs in the control channel region. As discussed above, the determination of the CCE indices from the REG bundle can be represented as k mod 2, in which k represents the REG bundle index. By utilizing this CCE mapping operation, the REG bundle indices are mapped to CCE indices, so that the CCE indices are continuous with respect to the REG bundle in frequency domain. Therefore, in the case of FIG. 4B, the CCE index may be indicated by $$\left\lfloor \frac{m}{3} \right\rfloor \mod 2,$$

in which m represents the REG index and ⌊•⌋ operator represents an operation of rounding down.

Figure 4C:
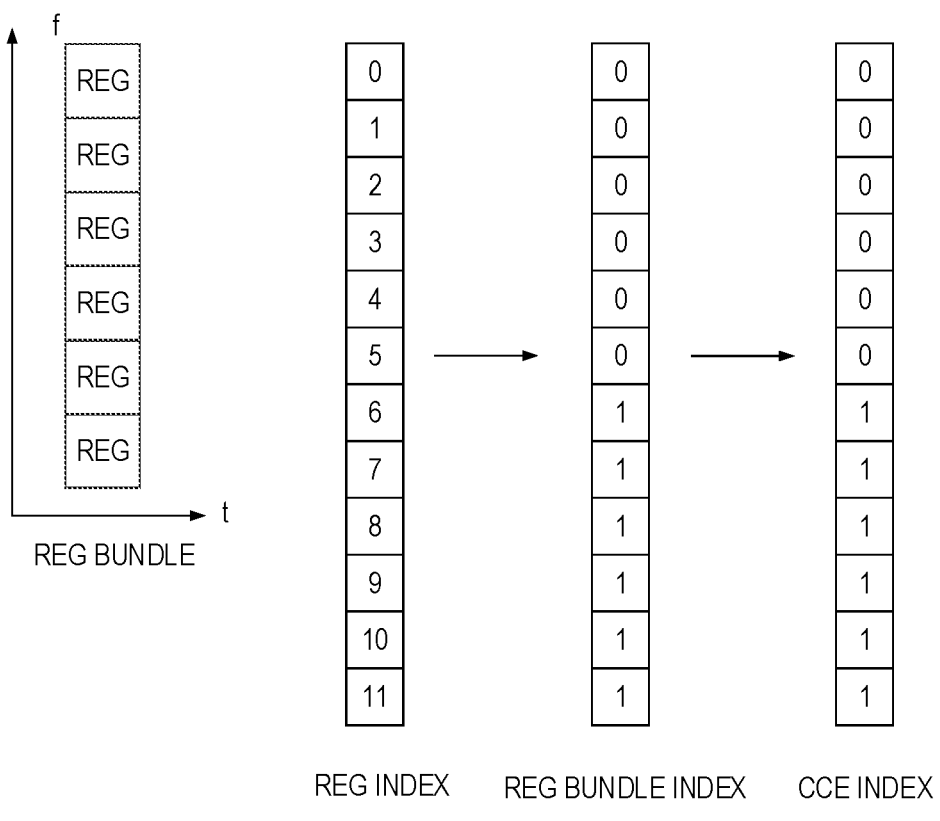

As shown in FIG. 4C, there is one OFDM symbol in the control channel region. The width of the control channel region, which may be represented by the number of REGs in the frequency domain of the control channel region, is 12 in this case. As for the pattern of the REG bundle, there is one OFDM symbol in time domain, which is equal to the number of OFDM symbols in the control channel region. The width of the REG bundle is 6, which is represented by the number of REGs in the frequency domain in the REG bundle. Accordingly, the determination of the REG bundle indices from the REG indices may be represented as $$\left\lfloor \frac{m}{6} \right\rfloor,$$

in which m represents the REG index and ⌊•⌋ operator represents an operation of rounding down. Through these operations, the every 6 consecutive REGs are grouped in one REG bundle; and therefore, the REGs in one REG bundle are contiguous in the frequency domain. As for the control channel region, there are two CCEs in the control channel region. Similarly, the determination of the CCE indices from the REG bundle can be represented as k mod 2, in which k represents the REG bundle index. By utilizing this CCE mapping operation, the REG bundle indices are mapped to CCE indices, so that the CCE indices are continuous with respect to the REG bundle in frequency domain. Therefore, in the case of FIG. 4C, the CCE index may be indicated by $$\left\lfloor \frac{m}{6} \right\rfloor \mod 2,$$

in which m represents the REG index and $\lfloor \cdot \rfloor$ operator represents an operation of rounding down.

Figure 4D:
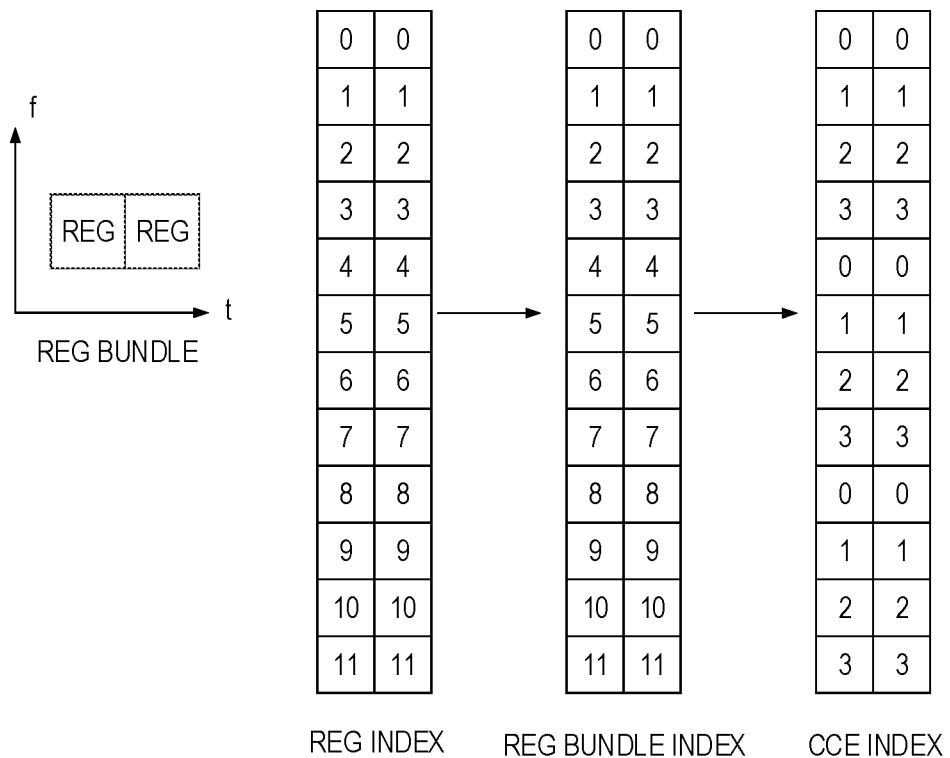

As shown in FIG. 4D, there are two OFDM symbols in the control channel region. The width of the control channel region, which may be represented by the number of REGs in the frequency domain of the control channel region, is 12 in this case. The total number of REGs in the control channel region is 24 in this case. As for the pattern of the REG bundle, there are two OFDM symbols in time domain, which is equal to the number of OFDM symbols in the control channel region. The width of the REG bundle is one, which is represented by the number of REGs in the frequency domain in the REG bundle. Accordingly, the determination of the REG bundle indices from the REG indices may be represented as m, in which m represents the REG index. It can be found that the REG bundle indices are the same to the REG indices. The REGs in one REG bundle are contiguous in the frequency domain. As for the control channel region, there are four CCEs in the control channel region. As discussed, the determination of the CCE indices from the REG bundle can be represented as k mod 4, in which k represents the REG bundle index. By utilizing this CCE mapping operation, the REG bundle indices are mapped to CCE indices, so that the CCE indices are continuous with respect to the REG bundle in frequency domain. Therefore, in the case of FIG. 4D, the CCE index may be indicated by m mod 4, in which m represents the REG index.

Figure 4E:
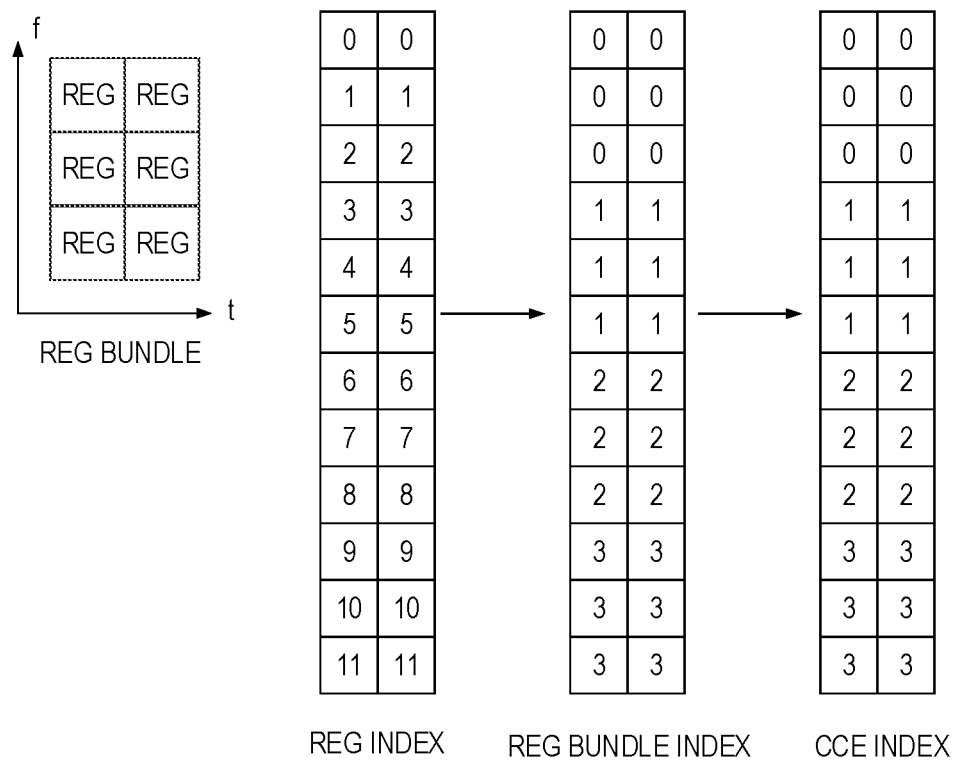

As shown in FIG. 4E, there are two OFDM symbols in the control channel region. The width of the control channel region, which may be represented by the number of REGs in the frequency domain of the control channel region, is 12 in this case. The total number of REGs in the control channel region is 24 in this case. As for the pattern of the REG bundle, there are two OFDM symbols in time domain, which is equal to the number of OFDM symbols in the control channel region. The width of the REG bundle is three, which is represented by the number of REGs in the frequency domain in the REG bundle. Accordingly, the determination of the REG bundle indices from the REG indices may be represented as $$\left\lfloor \frac{m}{3} \right\rfloor,$$

in which m represents the REG index and $\lfloor \cdot \rfloor$ operator represents an operation of rounding down. As for the control channel region, there are four CCEs in the control channel region. As discussed, the determination of the CCE indices from the REG bundle can be represented as k mod 4, in which k represents the REG bundle index. By utilizing this CCE mapping operation, the REG bundle indices are mapped to CCE indices, so that the CCE indices are continuous with respect to the REG bundle in frequency domain. Therefore, in the case of FIG. 4E, the CCE index may be indicated by $$\left\lfloor \frac{m}{3} \right\rfloor \mod 4,$$

in which m represents the REG index and $\lfloor \cdot \rfloor$ operator represents an operation of rounding down.

Figure 4F:
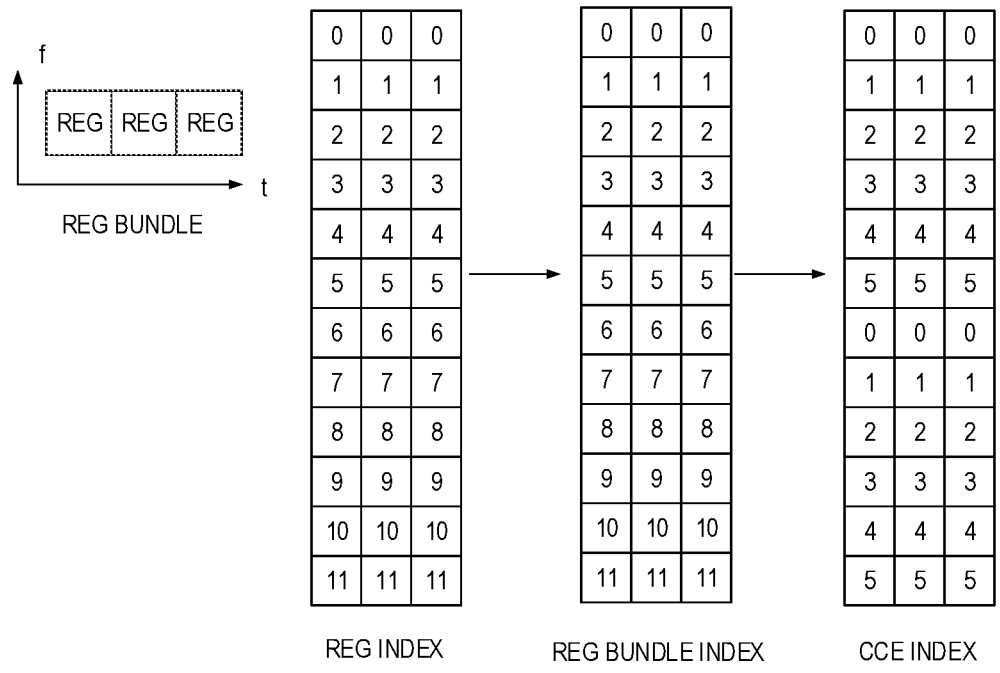

As shown in FIG. 4F, there are three OFDM symbols in the control channel region. The width of the control channel region, which may be represented by the number of REGs in the frequency domain of the control channel region, is 12 in this case. The total number of REGs in the control channel region is 36 in this case. As for the pattern of the REG bundle, there are three OFDM symbols in time domain, which is equal to the number of OFDM symbols in the control channel region. The width of the REG bundle is one, which is represented by the number of REGs in the frequency domain in the REG bundle. Accordingly, the determination of the REG bundle indices from the REG indices may be represented as m, in which m represents the REG index. It can be found that the REG bundle indices are the same to the REG indices respectively. As for the control channel region, there are 6 CCEs in the control channel region. As discussed, the determination of the CCE indices from the REG bundle can be represented as k mod 6, in which k represents the REG bundle index. By utilizing this CCE mapping operation, the REG bundle indices are mapped to CCE indices, so that the CCE indices are continuous with respect to the REG bundle in frequency domain. Therefore, in the case of FIG. 4F, the CCE index may be indicated by m mod 6, in which m represents the REG index.

Figure 4G:
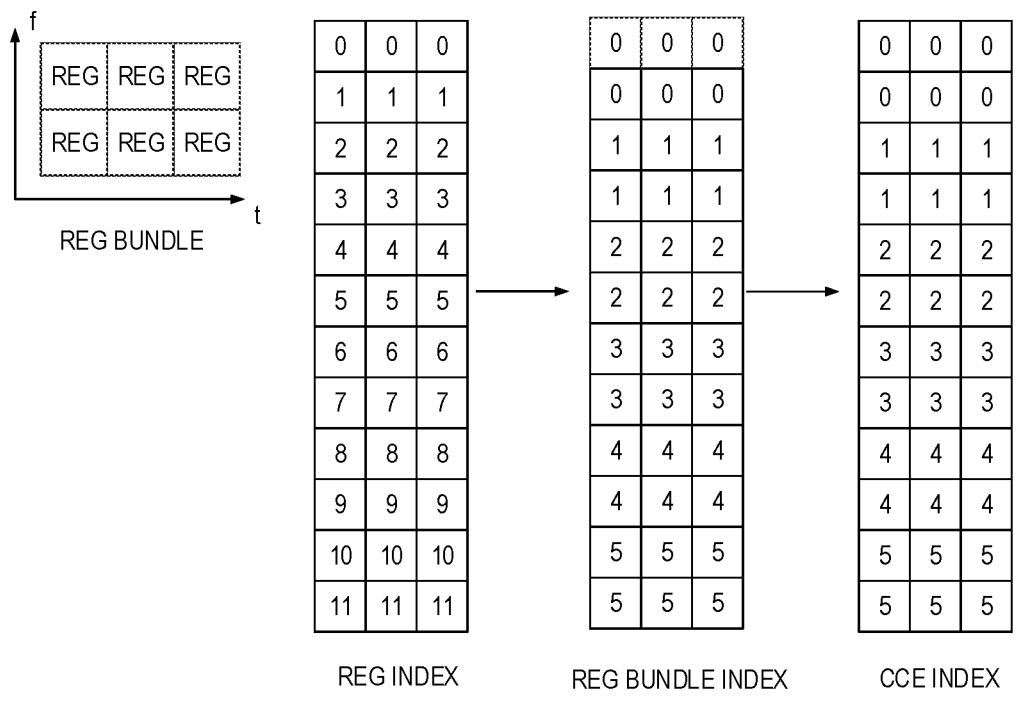

As shown in FIG. 4G, there are three OFDM symbols in the control channel region. The width of the control channel region, which may be represented by the number of REGs in the frequency domain of the control channel region, is 12 in this case. The total number of REGs in the control channel region is 36 in this case. As for the pattern of the REG bundle, there are three OFDM symbols in time domain, which is equal to the number of OFDM symbols in the control channel region. The width of the REG bundle is two, which is represented by the number of REGs in the frequency domain in the REG bundle. Accordingly, the determination of the REG bundle indices from the REG indices may be represented as $$\left\lfloor \frac{m}{2} \right\rfloor,$$

in which m represents the REG index and $\lfloor \cdot \rfloor$ operator represents an operation of rounding down. As for the control channel region, there are 6 CCEs in the control channel region. As discussed, the determination of the CCE indices from the REG bundle can be represented as k mod 6, in which k represents the REG bundle index. By utilizing this CCE mapping operation, the REG bundle indices are mapped to CCE indices, so that the CCE indices are continuous with respect to the REG bundle in frequency domain. Therefore, in the case of FIG. 4G, the CCE index may be indicated by $$\left\lfloor \frac{m}{2} \right\rfloor \mod 6,$$

in which m represents the REG index and ⌊•⌋ operator represents an operation of rounding down.

Figure 5:
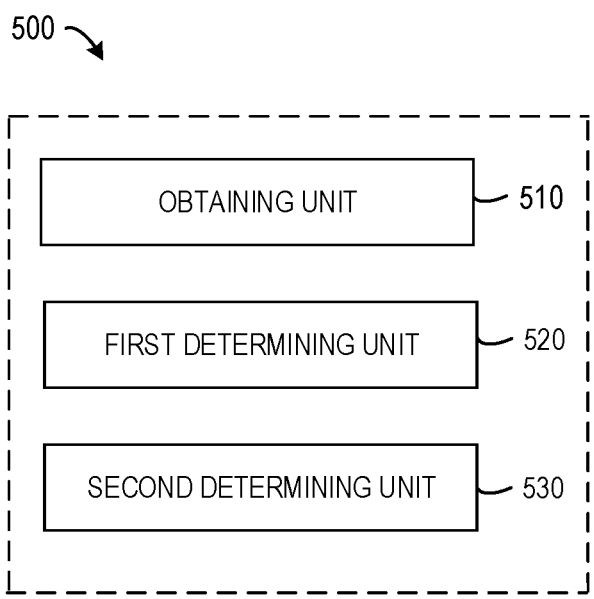
FIG. 5 shows a block diagram of an apparatus 500 in accordance with some embodiments of the present disclosure.

Now reference is made to FIG. 5, which shows a block diagram of an apparatus 500 in accordance with some embodiments of the present disclosure. It would be appreciated that the apparatus 500 may be implemented at the network device 110, or the terminal devices 120 and 130.

As shown, the apparatus 500 includes an obtaining unit 510 and a first determining unit 520 and a second determining unit 530. The obtaining unit 510 is configured to obtain REG indices for a plurality of REGs in a control channel region. The first determining unit 520 is configured to determine REG bundle indices based on the REG indices and a pattern of REG bundle, the pattern of REG bundle indicating the number of REGs in frequency domain and the number of OFDM symbols in time domain. The second determining unit 530 is configured to determine CCE indices based on the determined REG bundle indices and the number of CCEs in the control channel region, so that the CCE indices are continuous with respect to the REG bundle in frequency domain.

In an embodiment, the obtaining unit 510 may be configured to obtain REG initial indices for the plurality of REGs in the control channel region, the REG initial indices being continuous in different OFDM symbols in the control channel region; and determine the REG indices based on the REG initial indices, the REG indices being continuous for each OFDM symbol in the control channel region.

In an embodiment, the obtaining unit 510 may be configured to indexing, in an order of frequency of REGs, the REG indices for the plurality of REGs for each OFDM symbol in the control channel region.

In an embodiment, the first determining unit 520 may be configured to divide the REG indices by a width of the REG bundle, the width of the REG bundle indicating the number of REGs in a REG bundle in frequency domain; and round down the REG indices divided by the width of the REG bundle as the REG bundle indices.

In an embodiment, the first determining unit 530 may be configured to determine the modulo results of the REG bundle indices with respect to the number of CCEs in the control channel region, the number of CCEs being determined based on the number of the plurality of REGs in the control channel region and the number of REGs in a CCE; and obtain the CCE indices based on the modulo results.

In an embodiment, the apparatus 500 may further comprise a third determining unit, which is configured to determine the width of the REG bundle based on the number of REGs in a REG bundle and the number of OFDM symbols in the REG bundle in time domain.

In an embodiment, the apparatus 500 may further comprise a fourth determining unit, which may be configured to determine, from higher layer signaling, at least one of: the number of the plurality of REGs in the control channel region; the number of REGs in a REG bundle; the number of REGs in a REG bundle in frequency domain; the number of OFDM symbols in a REG bundle in time domain; and the number of REGs in a CCE.

In an embodiment, the apparatus 500 may be implemented at the network device 110. The apparatus 500 may further comprise a transmitting unit, which may be configured to transmit, based on the CCE indices, DCI of a plurality of terminal devices 120 and/or 130 in the control channel region.

In an embodiment, the apparatus 500 may be implemented at the terminal device 120 or 130. The apparatus 500 may further comprise a transmitting unit, which may be configured to receive, based on the CCE indices and the CCE aggregation levels, DCI of the terminal device 120 or 130 in the control channel region.

In an embodiment, the control channel region may be the CORESET in NR communication systems.

It is also to be noted that the apparatus 500 may be respectively implemented by any suitable technique either known at present or developed in the future. Further, a single device shown in FIG. 2 may be alternatively implemented in multiple devices separately, and multiple separated devices may be implemented in a single device. The scope of the present disclosure is not limited in these regards.

It is noted that the apparatus 500 may be configured to implement functionalities as described with reference to FIG. 2. Therefore, the features discussed with respect to the method 200 may apply to the corresponding components of the apparatus 500, and the features discussed with respect to the method 200 may apply to the corresponding components of the apparatus 500. It is further noted that the components of the apparatus 500 may be embodied in hardware, software, firmware, and/or any combination thereof. For example, the components of the apparatus 500 may be respectively implemented by a circuit, a processor or any other appropriate device. Those skilled in the art will appreciate that the aforesaid examples are only for illustration not limitation.

In some embodiment of the present disclosure, the apparatus 500 may comprise at least one processor. The at least one processor suitable for use with embodiments of the present disclosure may include, by way of example, both general and special purpose processors already known or developed in the future. The apparatus 500 may further comprise at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause the apparatus 500 to at least perform according to the method 200 as discussed above.

Based on the above description, the skilled in the art would appreciate that the present disclosure may be embodied in an apparatus, a method, or a computer program product. In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the embodiments of this disclosure may be illustrated and described as block diagrams, flowcharts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIG. 5 may be viewed as method steps, and/or as operations that result from operation of computer program code, and/or as a plurality of coupled logic circuit elements constructed to carry out the associated function(s). At least some aspects of the embodiments of the disclosures may be practiced in various components such as integrated circuit chips and modules, and that the embodiments of this disclosure may be realized in an apparatus that is embodied as an integrated circuit, FPGA or ASIC that is configurable to operate in accordance with the embodiments of the present disclosure.

Figure 6:
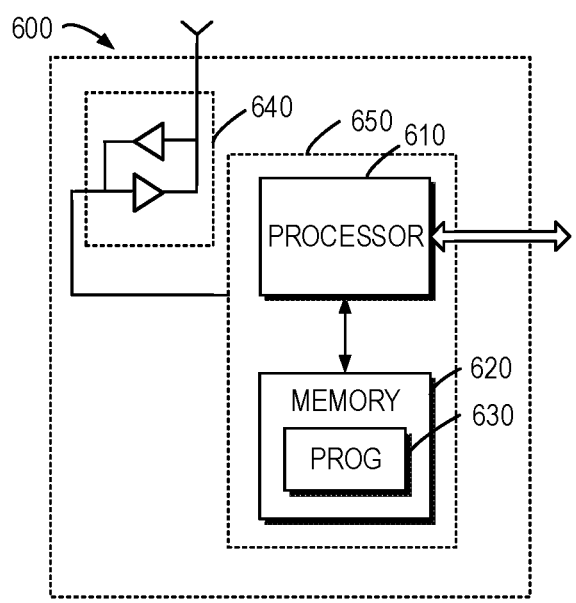
FIG. 6 is a simplified block diagram of a communication device 600 that is suitable for implementing embodiments of the present disclosure.

FIG. 6 is a simplified block diagram of a communication device 600 that is suitable for implementing embodiments of the present disclosure. As shown, the communication device 600 includes one or more processors 610, one or more memories 620 coupled to the processor(s) 610, one or more transmitters and/or receivers (TX/RX) 640 coupled to the processor 610.

The processor 610 may be of any type suitable to the local technical network, and may include one or more of general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

The memory 620 stores at least a part of a program 630. The TX/RX 640 is for bidirectional communications. The TX/RX 640 has at least one antenna to facilitate communication, though in practice a terminal device 120 or 130 or a network device 110 mentioned in this disclosure may have several ones. The communication interface may represent any interface that is necessary for communication with other network elements.

The program 630 is assumed to include program instructions that, when executed by the associated processor 610, enable the device 600 to operate in accordance with the embodiments of the present disclosure, as discussed herein with reference to FIG. 2. That is, embodiments of the present disclosure can be implemented by computer software executable by the processor 610 of the device 600, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing embodiments of this disclosure may become apparent to those skilled in the relevant arts in view of the foregoing description, when read in conjunction with the accompanying drawings. Any and all modifications will still fall within the scope of the non-limiting and embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A method comprising:
   receiving, by a user equipment (UE), configuration information of a control resource set (CORESET); and
   monitoring, by the UE, a Physical Downlink Control Channel (PDCCH) in the CORESET,
   wherein the PDCCH corresponds to at least one Control Channel Element (CCE) in the CORESET,
   wherein each of the at least one CCE corresponds to one Resource Element Group (REG) bundle,
   wherein a number of the REGs in the REG bundle is 6,
   wherein each of the 6 REGs equals one resource block during one Orthogonal Frequency Division Multiplexing (OFDM) symbol,
   wherein a value of a respective index of each of the at least one CCE is equal to a value of an index of the REG bundle to which the CCE corresponds, and
   wherein the respective index of each of the at least one CCE is numbered in integers in increasing order in a frequency domain within the CORESET.

2. The method of claim 1, wherein a continuous time duration of the CORESET, in a number of OFDM symbols, is 1, 2, or 3.

3. The method of claim 2, wherein a number of OFDM symbols of the REG bundle is equal to the number of OFDM symbols of the continuous time duration of the CORESET.

4. The method of claim 1, wherein the configuration information indicates a continuous time duration of the CORESET.

5. The method of claim 1, wherein the configuration information indicates a frequency domain configuration of the CORESET.

6. A method comprising:
transmitting, by a base station, configuration information of a control resource set (CORESET); and
transmitting, by the base station, a Physical Downlink Control Channel (PDCCH) in the CORESET, wherein the PDCCH corresponds to at least one Control Channel Element (CCE) in the CORESET,
wherein each of the at least one CCE corresponds to one Resource Element Group (REG) bundle,
wherein a number of REGs in the REG bundle is 6,
wherein each of the 6 REGs equals one resource block during one Orthogonal Frequency Division Multiplexing (OFDM) symbol,
wherein a value of a respective index of each of the at least one CCE is equal to a value of an index of the REG bundle to which the CCE corresponds, and
wherein the respective index of each of the at least one CCE is numbered in integers in increasing order in a frequency domain within the CORESET.

7. The method of claim 6, wherein a continuous time duration of the CORESET, in a number of OFDM symbols, is 1, 2, or 3.

8. The method of claim 7, wherein a number of OFDM symbols of the REG bundle is equal to the number of OFDM symbols of the continuous time duration of the CORESET.

9. The method of claim 6, wherein the configuration information indicates a continuous time duration of the CORESET.

10. The method of claim 6, wherein the configuration information indicates a frequency domain configuration of the CORESET.

11. A base station comprising:
at least one processor disposed at the base station, wherein the at least one processor is configured to:
transmit configuration information of a control resource set (CORESET); and
transmit a Physical Downlink Control Channel (PDCCH) in the CORESET, wherein the PDCCH corresponds to at least one Control Channel Element (CCE) in the CORESET,
wherein each of the at least one CCE corresponds to one Resource Element Group (REG) bundle,
wherein a number of REGS in the REG bundle is 6,
wherein each of the 6 REGs equals one resource block during one Orthogonal Frequency Division Multiplexing (OFDM) symbol,
wherein a value of a respective index of each of the at least one CCE is equal to a value of an index of the REG bundle to which the CCE(s) corresponds, and
wherein the respective index of each of the at least one CCE is numbered in integers in increasing order in a frequency domain within the CORESET.

12. The base station of claim 11, wherein a continuous time duration of the CORESET, in a number of OFDM symbols, is 1, 2, or 3.

13. The base station of claim 12, wherein a number of OFDM symbols of the REG bundle is equal to the number of OFDM symbols of the continuous time duration of the CORESET.

14. The base station of claim 11, wherein the configuration information indicates a continuous time duration of the CORESET.

15. The base station of claim 11, wherein the configuration information indicates a frequency domain configuration of the CORESET.

* * * * *